(12) United States Patent
Klein et al.

(10) Patent No.: US 11,220,090 B2
(45) Date of Patent: Jan. 11, 2022

(54) COMPOSITE PANE WITH A DISPLAY DEVICE

(71) Applicant: SAINT-GOBAIN GLASS FRANCE, Courbevoie (FR)

(72) Inventors: Marcel Klein, Baesweiler (DE); Daniel Damea, Würselen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 486 days.

(21) Appl. No.: 16/323,170

(22) PCT Filed: Jun. 23, 2017

(86) PCT No.: PCT/EP2017/065478
§ 371 (c)(1),
(2) Date: Feb. 4, 2019

(87) PCT Pub. No.: WO2018/024403
PCT Pub. Date: Feb. 8, 2018

(65) Prior Publication Data
US 2019/0176438 A1 Jun. 13, 2019

(30) Foreign Application Priority Data
Aug. 5, 2016 (EP) .................................... 16183053

(51) Int. Cl.
*B32B 17/10* (2006.01)
*G02B 27/01* (2006.01)
(Continued)

(52) U.S. Cl.
CPC .. *B32B 17/10036* (2013.01); *B32B 17/10211* (2013.01); *B32B 17/10541* (2013.01);
(Continued)

(58) Field of Classification Search
CPC ...... B32B 17/10036; B60Q 1/28; B60Q 1/26; B60Q 3/208; B60Q 1/268; B60K 35/00;
(Continued)

(56) References Cited

U.S. PATENT DOCUMENTS 3,317,906 A * 5/1967 Baldridge ......... B32B 17/10761
340/815.55
5,404,163 A 4/1995 Kubo
(Continued)

FOREIGN PATENT DOCUMENTS

CN 101687392 A 3/2010
DE 41 27 656 A1 2/1993
(Continued)

OTHER PUBLICATIONS

International Search Report as issued in International Patent Application No. PCT/EP2017/065478, dated Aug. 25, 2017.

*Primary Examiner* — Eric Blount
(74) *Attorney, Agent, or Firm* — Pillsbury Winthrop Shaw Pittman LLP

(57) ABSTRACT

A composite pane for a motor vehicle, includes an outer pane and an inner pane, which are joined to one another via a thermoplastic intermediate layer, and a display device for displaying optical status information with at least one light source, which emits light for generating optical status information, wherein the composite pane is connected to a receiver unit for wirelessly receiving status information of a control system, the light source is provided for reproducing the status information of the control system and is arranged in the composite pane in the intermediate layer between the outer pane and the inner pane.

6 Claims, 6 Drawing Sheets

Figure 1:
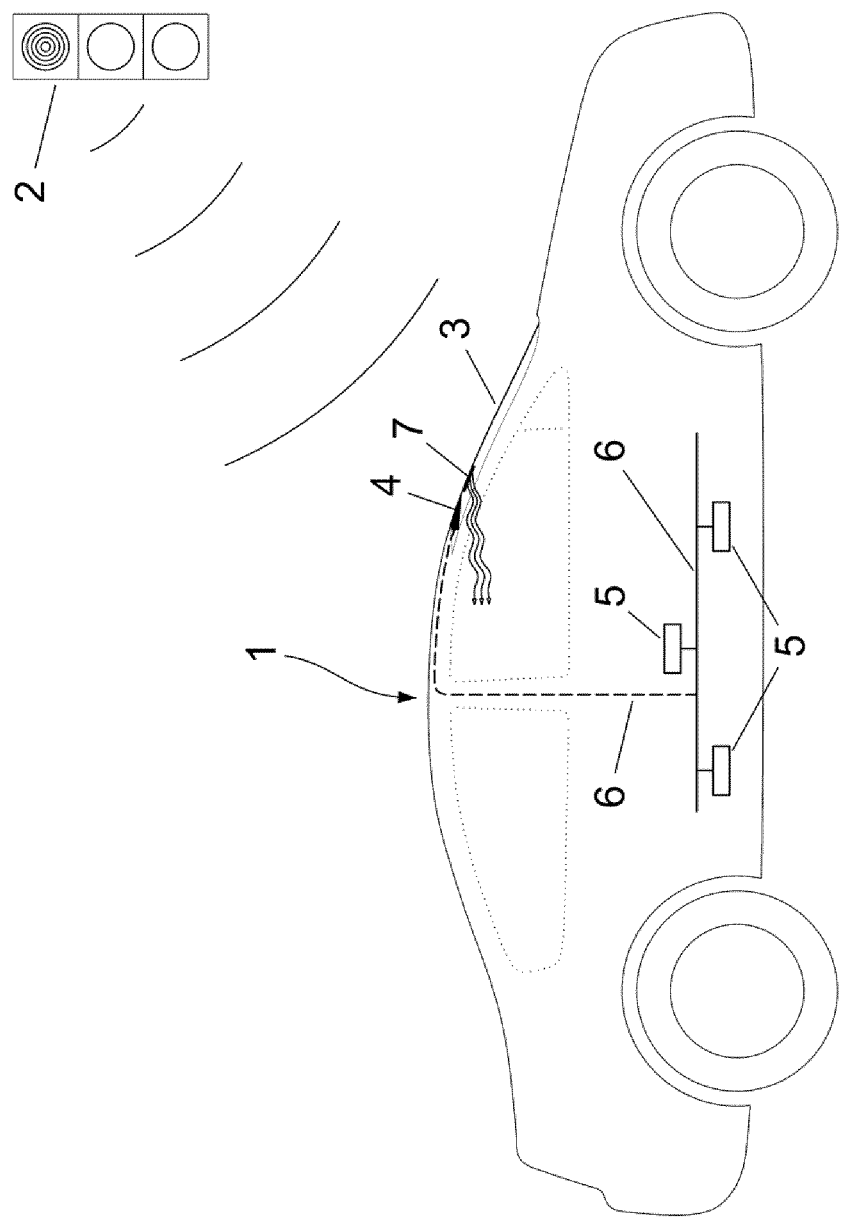

(51) Int. Cl.
  *B60Q 3/208* (2017.01)
  *B60K 35/00* (2006.01)
  *B60Q 1/26* (2006.01)
  *B60Q 1/28* (2006.01)
  *B60Q 9/00* (2006.01)

(52) U.S. Cl.
  CPC .............. *B60K 35/00* (2013.01); *B60Q 1/26* (2013.01); *B60Q 1/268* (2013.01); *B60Q 1/28* (2013.01); *B60Q 3/208* (2017.02); *G02B 27/01* (2013.01); *B60K 2370/1523* (2019.05); *B60K 2370/1529* (2019.05); *B60K 2370/332* (2019.05); *B60K 2370/785* (2019.05); *B60Q 9/00* (2013.01); *G02B 2027/014* (2013.01); *G02B 2027/0123* (2013.01); *G02B 2027/0138* (2013.01)

(58) Field of Classification Search
  CPC ...... B60K 2370/785; B60K 2370/1529; B60K 2370/332; G08B 27/01; G02B 2027/0138; G02B 2027/014
  USPC .......................................................... 430/425
  See application file for complete search history.

(56) References Cited

U.S. PATENT DOCUMENTS

| | | | | |
|---|---|---|---|---|
| 5,724,187 | A * | 3/1998 | Varaprasad | G02F 1/1525 359/608 |
| 6,825,454 | B2 | 11/2004 | Czarnetski et al. | |
| 7,745,838 | B2 * | 6/2010 | Lefevre | B32B 17/10018 257/88 |
| 8,227,079 | B2 * | 7/2012 | Torr | B32B 17/10761 428/332 |
| 8,461,602 | B2 * | 6/2013 | Lerman | H01L 25/0753 257/88 |
| 8,687,196 | B2 * | 4/2014 | Demma | B32B 17/10036 356/445 |
| 8,924,076 | B2 * | 12/2014 | Boote | B32B 17/10174 701/36 |
| 10,131,272 | B2 * | 11/2018 | Ban, Jr | B60S 1/04 |
| 10,310,304 | B2 * | 6/2019 | Linthout | B32B 17/10541 |
| 2010/0179725 | A1 * | 7/2010 | Boote | B32B 17/10541 701/36 |
| 2011/0277361 | A1 * | 11/2011 | Nichol | G02B 6/006 40/541 |
| 2014/0218268 | A1 | 8/2014 | Olesen et al. | |
| 2016/0109714 | A1 * | 4/2016 | Chen | G02B 27/0149 353/13 |

FOREIGN PATENT DOCUMENTS

| | | | |
|---|---|---|---|
| DE | 197 08 610 A1 | 9/1998 | |
| DE | 10 2007 012571 A1 | 1/2008 | |
| DE | 10 2007 030430 A1 | 2/2008 | |
| DE | 10 2009 048491 A1 | 4/2011 | |
| DE | 10 2011 080154 A1 | 1/2013 | |
| EP | 1 352 283 A2 | 10/2003 | |
| EP | 1 880 243 A2 | 1/2008 | |
| JP | 2001-513911 A | 9/2001 | |
| JP | 2003-034560 A | 2/2003 | |
| JP | 2016-112984 A | 6/2016 | |
| WO | WO-9839176 A1 * | 9/1998 | ............... B60R 1/00 |
| WO | WO 02/056085 A2 | 7/2002 | |
| WO | WO 2006/122305 A2 | 11/2006 | |
| WO | WO 2008/038376 A1 | 4/2008 | |
| WO | WO 2015/041106 A1 | 3/2015 | |

* cited by examiner

COMPOSITE PANE WITH A DISPLAY DEVICE

CROSS-REFERENCE TO RELATED APPLICATIONS

This application is the U.S. National Stage of PCT/EP2017/065478, filed Jun. 23, 2017, which in turn claims priority to European patent application number 16183053.4 filed Aug. 5, 2016. The content of these applications are incorporated herein by reference in their entireties.

The invention relates to a composite pane, a method for acquiring status information of a control system, and use of the composite pane in a motor vehicle.

Modern motor vehicles are increasingly equipped with additional functionalities. Also, for increasing traffic safety, motor vehicles are offered with driver assistance systems that give a driver important information about his current traffic situation. For this, systems that show information in the driver's field of vision are known, wherein the driver does not have to avert his glance from traffic in order to perceive the information.

Furthermore, vehicle windshields are used that are made of two glass panes that are laminated to one another via a thermoplastic film. The glass panes are arranged at an angle relative to one another, by using a thermoplastic film with a nonconstant thickness. This is also referred to as a wedge-shaped film or a wedge film. Composite glasses with wedge films are known, for example, from EP1880243A2.

Such windshields can have other components, such as rearview mirrors, switching surfaces, and sensors, in the central, upper section. A windshield thus equipped can present the problem that the driver's view is restricted by the components. In particular, when the vehicle is the first vehicle stopped at a traffic light, the driver's view of the traffic light can be significantly complicated by the components arranged at the upper edge. A low sun can also unacceptably dazzle the driver when looking at the traffic light. This results in undesirable and painful posture of the driver if he wants to keep the traffic light in view.

The object of the invention is to provide a composite pane with which a driver can perceive the status information of a traffic light with comfortable posture.

The object of the present invention is accomplished according to the invention by a composite pane in accordance with claim 1. Preferred embodiments emerge from the dependent claims.

The composite pane according to the invention for a motor vehicle has an outer pane and an inner pane that are joined to one another via a thermoplastic intermediate layer. The composite pane also includes a display device for displaying optical status information to a driver with at least one light source that emits light for generating optical status information, wherein the composite pane is provided for connection to a receiver unit for wirelessly receiving status information of a control system,
the light source is provided for reproducing the status information of the control system and is arranged in the composite pane between outer pane and inner pane at least partially in the intermediate layer.

By means of an arrangement of the light source in the composite pane between the outer pane and the inner pane in the intermediate layer, the light source can be easily integrated into a production process of the composite pane.

Expediently, the receiver unit receives status information of the control system, in particular of a traffic light, wirelessly. According to the invention, the light source is arranged in the composite pane between the outer pane and an inner pane in the intermediate layer and provided for reproducing the status information of the control system.

The status information of the control system is displayed to the driver on the composite pane such that he does not have to assume any unnatural posture in order to perceive current status information. The driver can easily and clearly discern the color of the traffic light on the composite pane. A relaxed posture of the driver while waiting at a traffic light results in a stress factor reduction and serves to increase the attentiveness of the driver. In addition, traffic safety is significantly increased through additional representation of the color of a traffic light on the composite pane.

Preferably, on the vehicle side, the receiver unit forwards the status information to a control device connected to the receiver unit. Then, the control device generates a control signal and forwards the control signal to the light source. As a function of the control signal, the light source generates light that optically shows the status of the control system.

In a preferred embodiment, the control device is connected to the receiver unit and/or to the light source via a data bus system. The data bus system can be a CAN, LIN, MOST system. The receiver unit can be a camera or a light sensor for acquiring status information of the control system. The receiver unit is mounted on a vehicle for that purpose and can be a component of a driver assistance system. This results in savings by making additional outfitting of the vehicle with energy and space consuming components unnecessary. Images can be acquired by the camera as status information. Alternatively or additionally, a light-optical signal can be acquired by the light sensor. The camera and/or the light sensor can be mounted in the front region of the motor vehicle, for instance, on the windshield, and can assume additional tasks in the driver assistance system.

The receiver unit has, in an advantageous embodiment, a wireless interface for transmitting data that processes data according to a Bluetooth, NFC, Zigbee, or DECT standard. Preferably, the receiver unit can establish a WLAN (IEEE 802.11, Wi-Fi) connection with the control system, in particular a traffic light, and receive the status data via a WLAN and/or an Internet network. The status information itself is preferably a radio signal. Particularly preferably, the radio signal is locally limited, for example, a Bluetooth or WLAN signal. The status information is, in particular, generated when a motor vehicle is detected in the transmission range of a traffic light by the control system, in particular, when it is determined that the vehicle has stopped.

In an advantageous embodiment of the composite pane according to the invention, the light source is arranged in a recess of the intermediate layer. The light source can be arranged directly between the outer pane in the inner pane and, thus, can emit the light particularly clearly and unambiguously for the driver.

For example, the light source is an active self-luminous light source, such as a light-emitting diode (LED), organic light-emitting diode (OLED), and/or an LCD screen. The particular advantage of the light-emitting diodes and the LCD screen resides in the small dimensions and intense luminosity. Both the light emitting diodes and the LCD screen are distinguished by very low energy consumption and long service life.

The intermediate layer is preferably transparent. The intermediate layer preferably contains at least one plastic, preferably polyvinyl butyral (PVB), ethylene vinylacetate (EVA), and/or polyethylene terephthalate (PET). The intermediate layer can, however, also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylenepropylenes, polyvinyl fluoride, and/or ethylene-tetrafluoroethylene, or copolymers or mixtures thereof. The intermediate layer can be formed by one film or even by a plurality of superimposed films, wherein the thickness of one film is preferably from 0.025 mm to 1 mm, typically 0.38 mm or 0.76 mm. The intermediate layer can preferably be thermoplastic and, after lamination, can adhesively bond the inner pane, the outer pane, and possible other intermediate layers to one another. In the context of the invention, lamination is thus the bonding of the inner pane, the intermediate layer, and the outer pane.

The production of the composite pane by lamination is done with, for example, vacuum bag methods, vacuum ring methods, calender methods, vacuum laminators, autoclave methods, or combinations thereof. The bonding of the outer pane and the inner pane is customarily done under the action of heat, vacuum, and/or pressure. As a result of the lamination of the light source in the intermediate layer of the composite pane, the production of the composite pane according to the invention is comparatively uncomplicated and economical.

The composite pane is suitable for separating a vehicle interior from an external environment. The composite pane can be used in many ways. It can, for example, be a windshield, a roof panel, a rear window, a side window, or another glazing delimiting the vehicle interior.

In another preferred embodiment, the display device is arranged in the central upper section of the composite pane. Alternatively or additionally, the display device can be arranged on the lower left edge of the composite pane. The display device can be connected to a voltage source and to a signal line via a flexible foil conductor (flat conductor, ribbon conductor), a metallic wire, in particular a round conductor or a stranded conductor, which forwards the control signal of the control device, for example, in a motor vehicle via a CAN bus. A foil conductor is, for example, a strip or band containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheath, for example, based on polyimide. Alternatively, thin metal wires can also be used as an electrical connection.

The composite pane or the inner pane and the outer pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The composite pane or the inner pane and the outer pane are preferably transparent, in particular for use of the pane as a windshield of a vehicle or other uses in which high light transmittance is desired. In the context of the invention, "transparent" means a pane that has transmittance greater than 70% in the visible spectral range. For panes that are not within the traffic-relevant field of vision of the driver, for example, for roof panels, the transmittance can, however, also be much lower, for example, greater than 5%.

The outer pane and the inner pane preferably have a constant thickness with substantially plane-parallel primary surfaces and a peripheral side edge connecting them.

The thickness of the inner pane is, in an advantageous embodiment, from 0.4 mm to 3.5 mm, preferably from 0.9 mm to 2.1 mm.

The thickness of the outer pane is, in an advantageous embodiment, at least 1.4 mm, preferably at least 1.6 mm. The thickness of the outer pane is preferably at most 4.5 mm, preferably at most 2.1 mm. In this range, the composite pane has advantageous mechanical stability and noise-shielding properties but is nevertheless still sufficiently thin and light to be able to be used as a windshield.

In a preferred embodiment, the outer pane and inner pane are not prestressed. Nevertheless, during lamination of the panes, a characteristic distribution of tensile and compressive stresses develops, which the person skilled in the art can, however, distinguish without difficulty from stresses that are intentionally produced by the use of prestressed panes.

The outer pane, the inner pane, and the thermoplastic intermediate layer can be clear and colorless, but also tinted or colored. The total transmittance through the composite pane is, in a preferred embodiment, greater than 70%, in particular when the composite pane is a windshield. The term "total transmittance" is based on the process defined by ECE-R 43, Annex 3, § 9.1 for testing light permeability of motor vehicle windows.

The composite pane is preferably curved in one or a plurality of spatial directions, as is customary for motor vehicle windows, typical radii of curvature being in the range from approx. 10 cm to approx. 40 m. The composite pane can, however, also be flat, for example, when it is provided as a pane for buses, trains, or tractors.

The wedge angle of the intermediate layer can be constant in its vertical course, resulting in a linear change in thickness of the intermediate layer, with the thickness typically becoming greater from the bottom to the top. The directional indication "from the bottom to the top" refers to the direction from the lower edge to the upper edge, i.e., the vertical course. There can also be more complex thickness profiles in which the wedge angle is linearly or nonlinearly variable from the bottom to the top (in other words, location-dependent in the vertical course).

Preferably, the thickness of the intermediate layer increases in the vertical course from the bottom to the top, at least in sections.

The thickness of the intermediate layer can be constant in horizontal sections (in other words, sections roughly parallel to the upper edge and the lower edge). In that case, the thickness profile is constant over the width of the composite pane. The thickness can, however, also be variable in horizontal sections. In that case, the thickness is variable not only in the vertical but also in the horizontal course.

The intermediate layer is formed by at least one thermoplastic film. The wedge angle can be produced by suitable extrusion of the film or by stretching a film having constant thickness in the initial state. The intermediate layer can be formed by a single film or also by more than one film. In the latter case, at least one of the films must be formed with the wedge angle. The intermediate layer can also be formed from a so-called "acoustic film", which has a noise-damping effect. Such films typically consist of at least three plies, wherein the middle ply has higher plasticity or elasticity than the outer layer surrounding it, for example, as a result of a higher plasticizer content.

The intermediate layer preferably has a minimum thickness from 0.4 mm to 1.5 mm, particularly preferably from 0.5 mm to 1.0 mm. The term "minimum thickness" refers to the thickness at the thinnest point of the intermediate layer, i.e. typically, the thickness at the lower edge of the composite pane. Composite panes with thinner intermediate layers frequently have excessively low stability to be used as vehicle windows.

Another aspect of the invention comprises a method for acquiring status information of a control system, in particular of a traffic light, wherein
- a receiver unit of a motor vehicle acquires status information of the control system by means of a light optical signal or radio signal and forwards it to a control device,
- the status information is received by a control device of the motor vehicle and a control signal for reproducing the status information is transmitted to a light source, wherein the light source is arranged in the composite pane between an outer pane and an inner pane in an intermediate layer of the composite pane, and
- after receiving the status information, the control device again requests status information from the receiver unit.

While the speed of the motor vehicle is less than or equal to a speed threshold value, the status information is repeatedly requested by the control device.

Preferably, the status information is repeatedly requested by the control device as long as the motor vehicle is stopped. When the status information changes, the change is discerned by the control device and a changed control signal is transmitted to the light source. The changed control signal causes the light source of the display device to display changed optical status information to the vehicle driver.

The invention further includes the use of a composite pane in a motor vehicle, preferably a passenger car, as a windshield or side window.

In the following, the invention is explained in detail with reference to drawings and exemplified embodiments. The drawings are a schematic representation and not true to scale. The drawings in no way restrict the invention.

Figure 2:
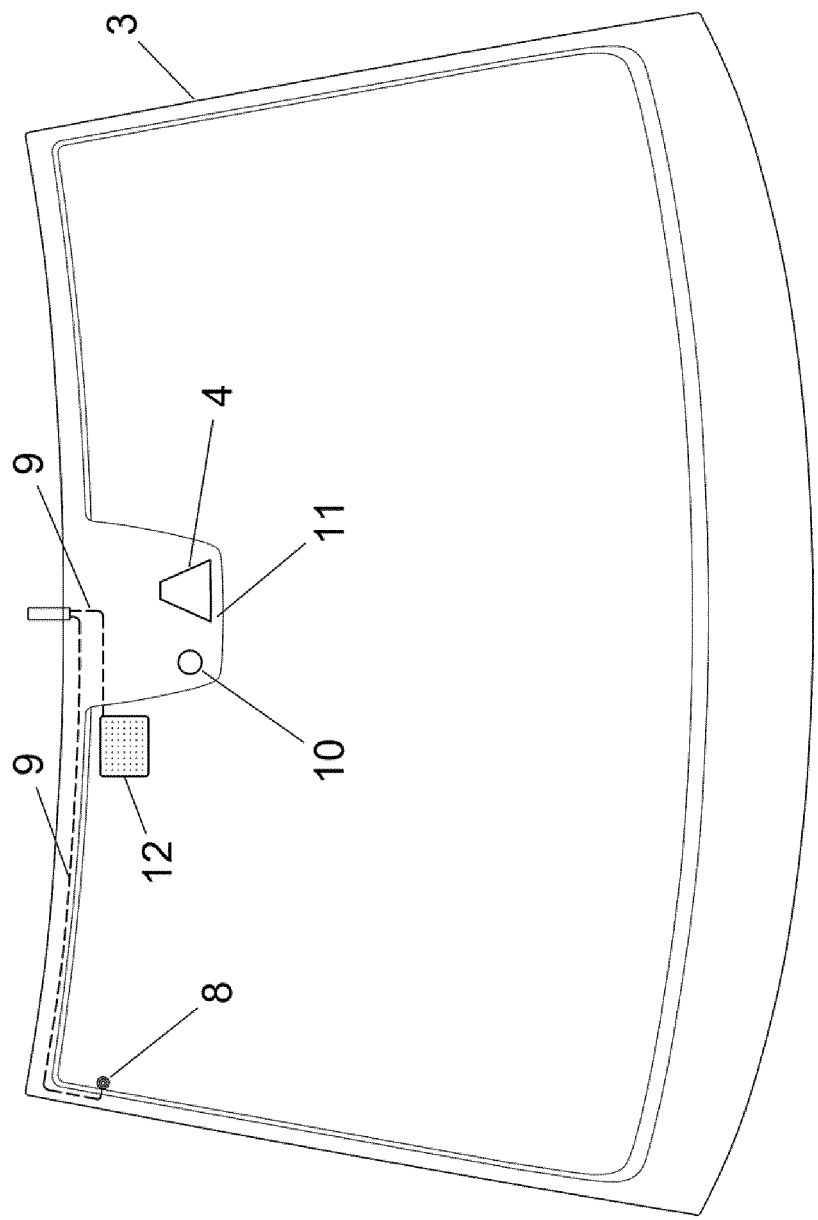
Figure 3:
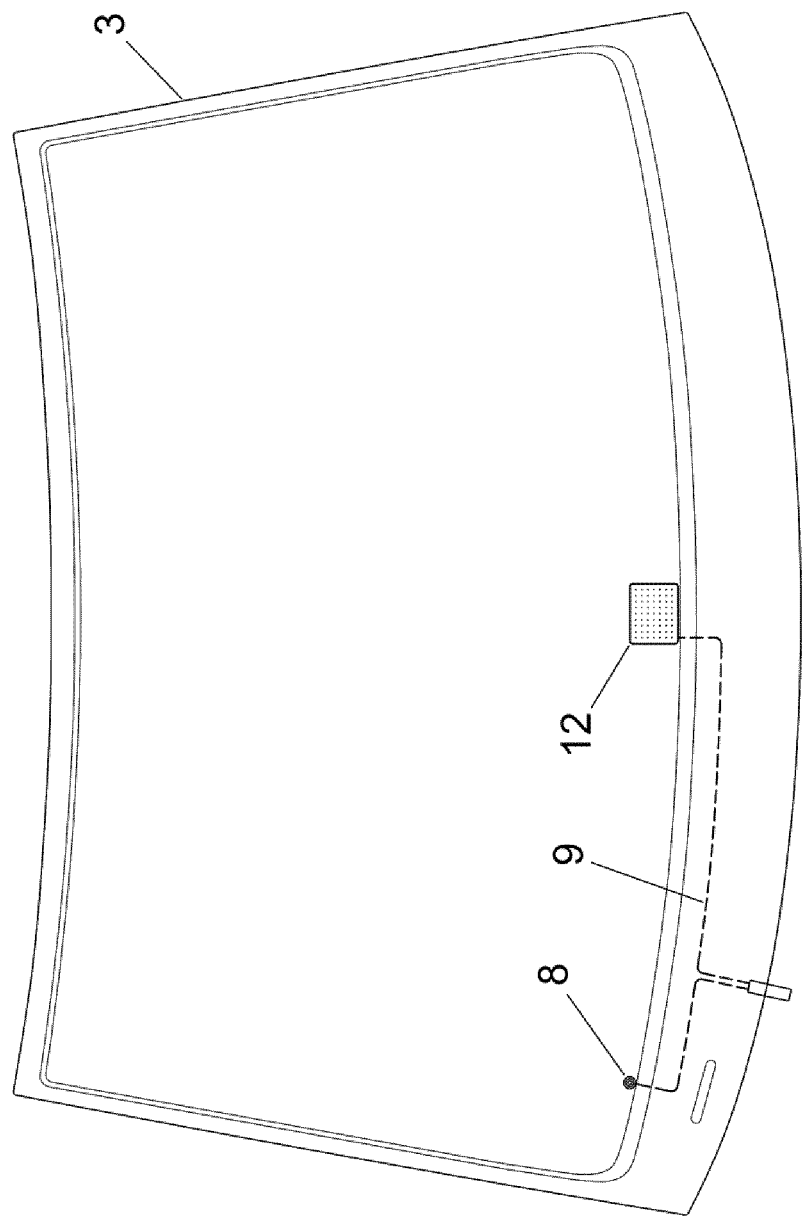
Figure 4:
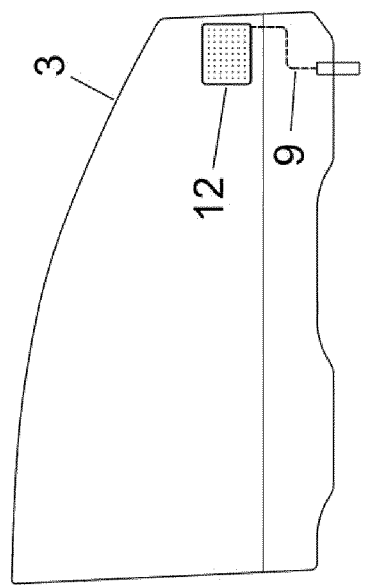
Figure 5:
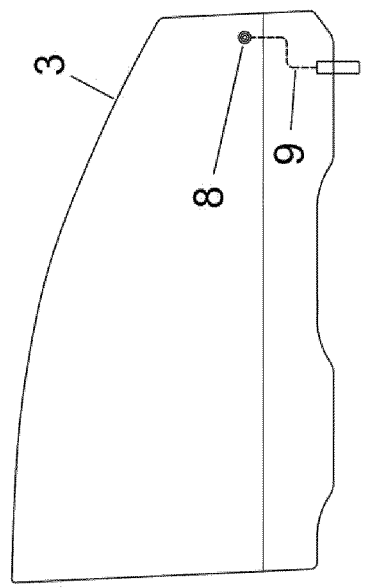
Figure 6:
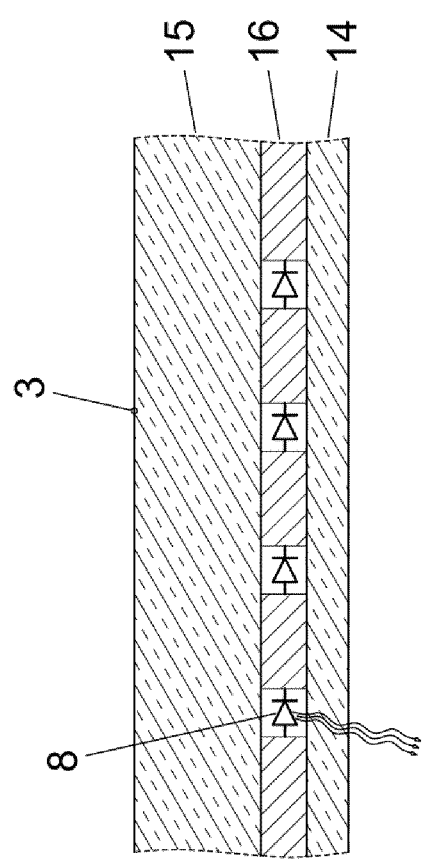
Figure 7:
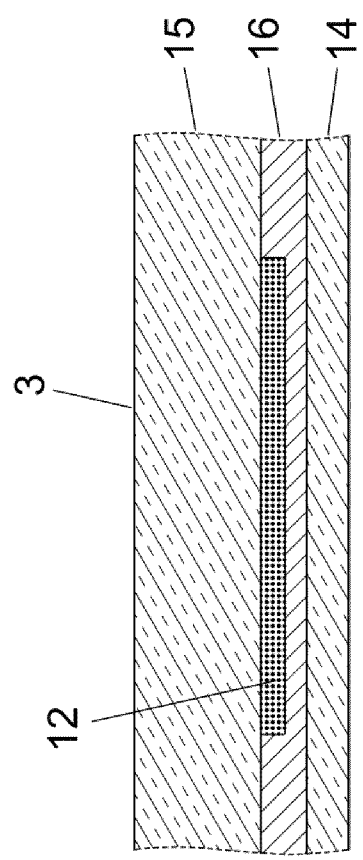

They Depict:

FIG. 1 a representation of a motor vehicle with a composite pane according to the invention, FIG. 2 a plan view of an embodiment of a composite pane according to the invention, FIG. 3 a plan view of another embodiment of a composite pane according to the invention as a windshield, FIG. 4 a plan view of an embodiment of a composite pane according to the invention as a side window, FIG. 5 a plan view of another embodiment of a composite pane according to the invention as a side window, FIG. 6 a cross-section of an embodiment of the composite pane according to the invention, and FIG. 7 a cross-section of another embodiment of the composite pane according to the invention.

FIG. 1 depicts a motor vehicle 1 that is situated in the region of a traffic light 2 of a control system. The motor vehicle 1 has a composite pane 3 as a windshield and is equipped with a receiver unit for receiving status information of the traffic light 2. The receiver unit is implemented in the motor vehicle as a camera 4 of a driver assistance system integrated in the motor vehicle. Alternatively or additionally, the receiver unit can be implemented as a receiver of a radio signal transmitted by the traffic light 2. Such a receiver can be a Wi-Fi (WLAN), Bluetooth, ZigBee, NFC, compatible, mobile device.

The driver assistance system can have other components, such as a display device 7 and is provided for communication with other devices of the motor vehicle 1. Furthermore, the motor vehicle 1 has a plurality of integrated control devices 5 that are networked with each other via a data bus system 6. The data bus system 6 is implemented as a CAN, LIN, or MOST bus system that is suitable for transmitting control signals and status information of a control device 5. In addition, a vehicle diagnostic system can be connected to such a data bus system.

The motor vehicle 1 also includes a composite pane 3 as a windshield, which has the display device 7 for displaying optical status information to a vehicle driver. The display device 7 includes a plurality of light sources that are implemented as LEDs 8. The LEDs 8 are arranged in the composite pane 3 such that they can be easily detected visually by the vehicle driver's eye.

When a motor vehicle 1 approaches the traffic light 2 and the traffic light 2 displays a red signal, the motor vehicle 1 stops at a stop line in front of the traffic light 2. The camera 4 of the driver assistance system acquires the status of the traffic light 2, by receiving or recording status information (red), for example, in the form of images of the traffic light. The camera 4 processes the status information (red) and forwards this to the control device 5 via the data bus system 6. The control device 5 receives the status information (red) and processes it by producing a corresponding control signal for displaying the status information (red) and forwarding it to the display device 7 via the data bus system 6. Alternatively, the connection between the display device 7 and the control device 5 can be implemented as a separate line, wherein the separate line is suitable for transmitting the status information (red) without a data bus system 6.

The display device 7 receives the control signal and displays the status information (red) of the traffic light. For this, the LEDs 8 of the display device 7 emit a corresponding color (red).

While the motor vehicle 1 is stopped at the traffic light 2, the control device 5 again requests further status information of the traffic light 2. For this, the control device 5 transmits a corresponding request to the camera 4 and then compares the status information (red) with the newly requested status information. If the status information is identical, the control device again repeats its request at short time intervals. When the evaluation of the control device 5 indicates that the status information is not identical, the control device 5 forwards a control signal for displaying the newly requested status information (green) to the display device 7. The display device 7 receives the control signal and displays the status information (green) of the traffic light 2. For this, the LEDs 8 of the display device 7 emit a corresponding color (green). The driver detects the green signal and sets the motor vehicle 1 in motion.

If the motor vehicle is nearly stopped, the control device 5 compares a current speed of the vehicle 1 with a speed threshold value stored in the vehicle. If the current speed is equal to or less than the speed threshold value, the control device 5 transmits a request to the camera 5. If the motor vehicle is in motion and the current speed of the vehicle 1 is greater than the speed threshold value, no request is transmitted to the camera.

FIG. 2 depicts a plan view of an exemplary embodiment of a composite pane according to the invention 3 as a windshield of a motor vehicle 1 with a display device 7. The display device 7 is arranged in the central, upper section of the composite pane 3. The display device 7 comprises an LCD screen 12, LED 8, and/or OLEDs. Such light sources for presenting the status information of a traffic light 2 can be arranged at any positions in the composite pane 3, and can, for example, be laminated in the interior of the composite pane 3.

Other components, such as a rain sensor 10, a rearview mirror, or a camera 4 can also be arranged in the central, upper section 11 of the composite pane 3. The display device 7 is connected via an electrical line connection 9 to a control device 5 arranged outside the composite pane 3. Alternatively, the connection to the control device 5 can also be implemented as a wireless connection and the display device 7 can have an independent power supply (battery or photovoltaic module).

FIG. 3 depicts a plan view of another embodiment of a composite pane 3 according to the invention as a windshield of a motor vehicle 1 with a display device 7. The exemplary embodiment depicted corresponds substantially in structure to the windshield according to the invention of FIG. 2 such that, in the following, only the respective differences will be discussed. The display device 7 is, unlike the windshield in FIG. 2, arranged in a lower section of the windshield. Analogously to FIG. 2, the display device in FIG. 3 has two light sources (8, 12). On the outer, lower edge of the windshield, a first light source is equipped with a plurality of LEDs 8; and in the central, lower section of the windshield, an LCD screen 12 is situated. Both the LCD screen 12 and the LEDs 8 are, in each case, connected via an electrical line connection 9 to a control device 5 arranged outside the composite pane 3.

FIG. 4 depicts a plan view of an embodiment of a composite pane according to the invention 3 as a side window of a motor vehicle. The composite pane 3 is a front side window of the motor vehicle and has a display device 7 that is implemented as LEDs 8. The LEDs are arranged readily visible for a driver in a lower, outer section of the composite pane 3. An alternative embodiment of the composite pane 3 as a side window is depicted in FIG. 5. Analogously to the side window in FIG. 4, the display device 7 is arranged in the lower, outer section of the composite pane 3; however, the display device in FIG. 5 is implemented as an LCD screen.

FIG. 6 depicts a cross-section of a composite pane according to the invention 3. The composite pane 3 comprises, for example, an inner pane 14 and an outer pane 15 that are joined to one another via an intermediate layer 16. The inner pane 14 and the outer pane 15 are preferably transparent, in particular for use of the composite pane 3 as a windshield. The outer pane 15 can alternatively even include green tinting. The dimensions of the composite pane 3 are, for example, 1.4 m×1.2 m. The inner pane 1 is, for example, intended to face the interior in the installed position. In other words, the interior-side surface of the inner pane 14 is accessible from the interior out, whereas the exterior-side surface of the outer pane 15 points outward. The inner pane 14 and the outer pane 15 are made, for example, of soda lime glass that was produced in a float method. The inner pane 14 and the outer pane 15 can be non-tempered or tempered. The thickness of the inner pane 14 is, for example, 0.7 mm, and the thickness of the outer pane 15 is, for example, 2.1 mm. The intermediate layer 16 is a thermoplastic intermediate layer 16 and is made, for example, of polyvinyl butyral (PVB). It has a thickness of, for example, 0.76 mm.

Four LEDs 8 are laminated in the intermediate layer 16 between the inner pane 14 and the outer pane 15. Alternatively or additionally, an LCD screen can be arranged between the inner pane 14 and the outer pane 15. An LCD screen thus arranged can rest directly against the inner pane 14 and/or the outer pane 15. At the same time, the composite pane 3 can have a transparent coating that substantially consists of a plurality of functional layers made, for example, of indium tin oxide (ITO). Such coatings are composed of a plurality of layers. A layer stack can have at least one pane, one adhesive layer, one functional layer, one so-called barrier layer, and/or one antireflection layer. A functional layer can consist of at least one electrically conductive oxide (TCO), preferably indium tin oxide (ITO), fluorine-doped tin oxide ($SnO_2$:F), antimony-doped tin oxide ($SnO_2$:Sb), aluminum-doped zinc oxide (ZnO:Al), and/or gallium-doped zinc oxide (ZnO:Ga).

FIG. 7 depicts another cross-section of the composite pane 3 according to the invention with the LCD screen 12 as a light source of the display device 7. The LCD screen 12 is embedded between the inner pane 14 and the outer pane 15 in the intermediate layer 16. One surface of the LCD screen 12 rests directly against one surface of the outer pane 15.

LIST OF REFERENCE CHARACTERS 1 motor vehicle
2 traffic light
3 composite pane
4 camera
5 control device
6 data bus system
7 display device
8 LED
9 line connection
10 rain sensor
11 section of the composite pane
12 LCD screen
14 inner pane
15 outer pane
16 intermediate layer

The invention claimed is:

1. A composite pane for a motor vehicle, comprising an outer pane and an inner pane, which are joined to one another via a thermoplastic intermediate layer, and a display device for displaying optical status information with at least one light source that emits light for generating optical status information light, wherein
 the composite pane is configured to connect to a receiver unit for wirelessly receiving status information of a traffic light,
 the light source is configured to reproduce status information of the traffic light and is arranged in the composite pane between the outer pane and the inner pane at least partially in the intermediate layer,
 the light source is at least one light-emitting diode (LED), organic light-emitting diode (OLED), and/or an LCD screen, and
 the receiver unit is a camera for optically acquiring status information of the traffic light and has a wireless interface for transmitting data by means of a radio signal,
 wherein the receiver unit is connected to a control device for forwarding the status information and the control device is provided for generating a control signal for reproducing the status information displayed by the display device,
 wherein status information is generated when a motor vehicle is detected in a transmission range of the traffic light by the traffic light, and the control device is configured to request further status information of the traffic light to the receiver unit while the motor vehicle is stopped at the traffic light and then compares the status information with the requested further status information, wherein the control device is configured to forward a control signal for displaying the requested further status information to the display device when the comparison carried out by the control device indicates that the status information is not identical to the requested further status information.

2. The composite pane according to claim 1, wherein the control device is configured to control the light source and to transmit the control signal to the light source.

3. The composite pane according to claim 1, wherein the light source is arranged in a recess of the thermoplastic intermediate layer.

4. The composite pane according to claim 1, wherein the control device is connected to the receiver unit and/or to the light source via a data bus system.

5. The composite pane according to claim 1, which is a motor vehicle windshield.

6. The composite pane according to claim 1, wherein the display device is arranged in an upper section of the composite pane.

* * * * *